United States Patent [19]
Solomon

[11] 3,929,511
[45] Dec. 30, 1975

[54] THERMOCOUPLE ASSEMBLY

[75] Inventor: Ralph E. Solomon, Upland, Calif.

[73] Assignee: Jade Controls, Inc., Upland, Calif.

[22] Filed: Feb. 25, 1974

[21] Appl. No.: 445,575

[52] U.S. Cl. ............... 136/228; 29/573; 136/201; 136/230
[51] Int. Cl.² .................................... H01L 1/02
[58] Field of Search ........... 136/201, 228, 230, 242; 431/80; 29/573

[56] References Cited
UNITED STATES PATENTS

| | | | |
|---|---|---|---|
| 2,981,106 | 4/1961 | Knudsen et al. | 136/242 |
| 3,532,558 | 10/1970 | Ray | 136/230 |

Primary Examiner—Maynard R. Wilbur
Assistant Examiner—Richard E. Berger
Attorney, Agent, or Firm—Gausewitz, Carr & Rothenberg

[57] ABSTRACT

A thermocouple assembly in which the inner end of the tip is provided with a straight knurl which is forced into the bore of the base fitting so that the teeth of the knurl become embedded in the wall of the base fitting, the end of the tip having a beveled surface clamping a flared end of the conductor tubing against a similarly beveled surface of the fitting within the bore so that the tip, fitting and tubing are mechanically and electrically connected.

12 Claims, 6 Drawing Figures

U.S. Patent    Dec. 30, 1975    3,929,511
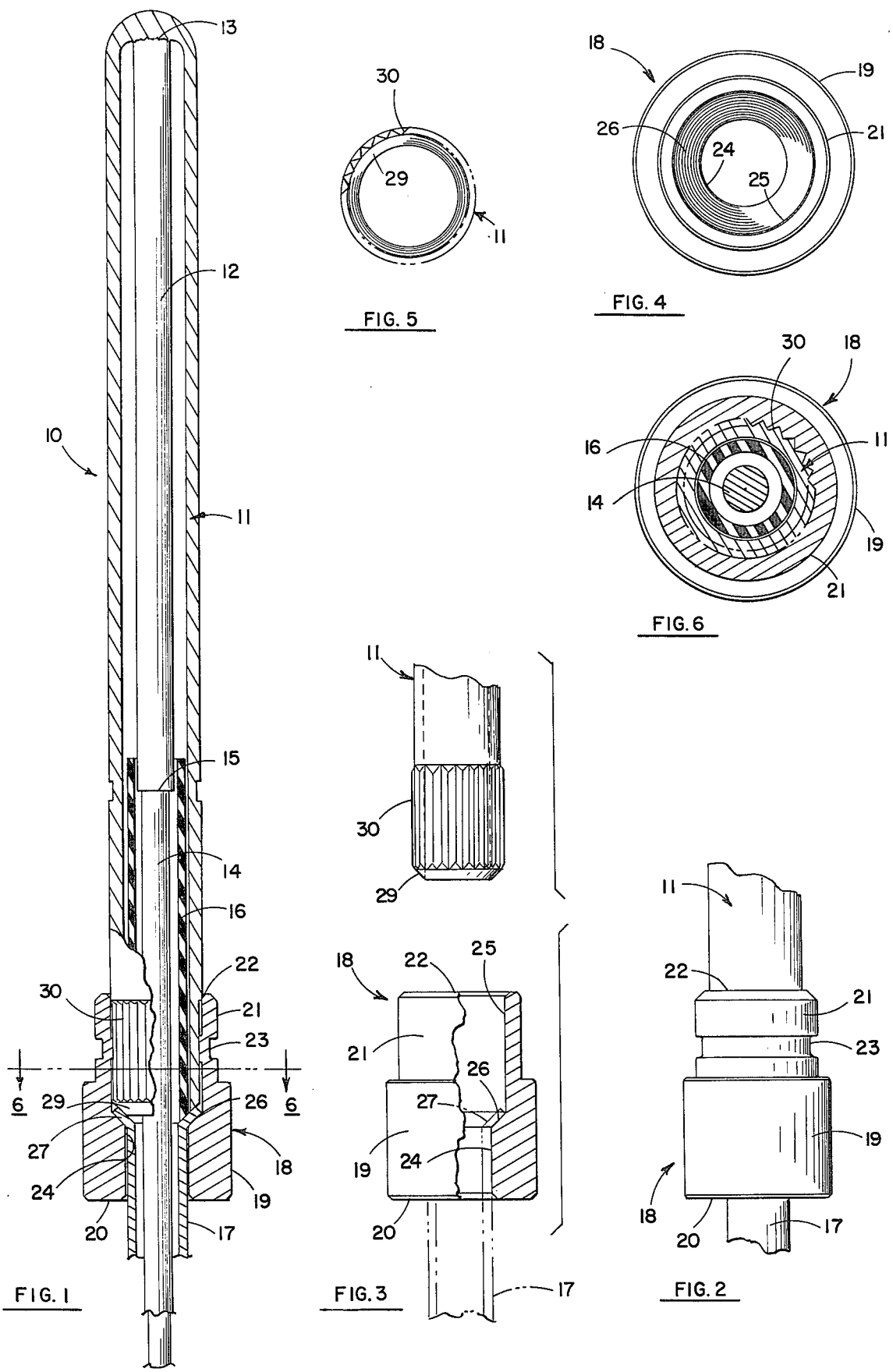

THERMOCOUPLE ASSEMBLY

BACKGROUND OF THE INVENTION:

1. Field of the Invention

This invention pertains to a thermocouple assembly.

2. Description of Prior Art

Thermocouples used for providing energy to the magnets of safety pilot valves for burner controls of gas appliances such as water heaters, floor furnaces and the like, include a tip commonly made of ferritic stainless steel which must be connected to copper conductive tubing that extends from the thermocouple to the appliance. The conductive tubing is at a positive potential when the thermocouple tip is subjected to heat, and within it is a wire at a negative potential. The thermocouple tip and the conductor tubing must be connected, which has been accomplished by brazing at a base fitting. Normally a silver-copper brazing alloy is used, together with a flux, with the brazing taking place at a temperature exceeding 1200°F. This procedure is expensive and time consuming. It requires purging to remove contaminants after the brazing is completed, but even so, there are corrosive residues which significantly reduce the thermocouple service life. Thus, the arrangement for connecting the thermocouple tip to the conductor tubing at the base fitting has been relatively costly and frequently a source of premature failure.

SUMMARY OF THE INVENTION

The present invention provides a greatly improved means for connecting the thermocouple tip to the conductor tubing at the base fitting, entirely obviating the need for brazing. The connection is accomplished much more rapidly and economically than in the past, providing a superior mechanical and electrical connection between the parts. All of the problems attendant the brazing operation are eliminated. Not only is the expense of brazing and fluxing materials avoided, but also the use of gaseous fuels is eliminated in this period of critical energy supplies.

In accordance with the present invention, the base fitting is provided with a beveled surface within a cylindrical bore, the conductor tubing being given a flared end that complementarily engages the beveled surface of the fitting. The end of the tip is given a straight knurl having a larger major diameter than that of the inside diameter of the fitting, while the minor diameter of the knurl is slightly less than the fitting diameter. The end of the tip is given a bevel at the same angle as that of the bevel within the bore. The tip is assembled to the base fitting merely by forcing the serrated end of the tip into the bore of the fitting causing the teeth of the serration to bite into the wall of the fitting at the bore and form a secure mechanical connection. A minimum of 500 pounds force is exerted in forcing the tip into the fitting so that the parts are securely held together and the flared end of the conductor tubing is firmly clamped between the end of the tip and the beveled surface within the bore. The connection made at the fitting is essentially gas tight. The serrations, by becoming embedded in the wall of the fitting at the bore, provide a large area of contact so that a superior and virtually resistance-free electrical connection is made. The joint formed in this manner does not require copper for the conductor tubing as has been necessary in the past, but other materials may be used as well.

BRIEF DESCRIPTION OF THE DRAWINGS

FIG. 1 is a longitudinal sectional view of a thermocouple assembly;

FIG. 2 is a side elevational view of the base portion of the thermocouple assembly of FIG. 1;

FIG. 3 is an exploded side elevational view, partially broken away, of the base fitting and the inner end portion of the thermocouple tip;

FIG. 4 is an end elevational view of the base fitting;

FIG. 5 is an end elevational view of the thermocouple tip; and

FIG. 6 is a transverse sectional view taken along line 6—6 of FIG. 1.

DESCRIPTION OF THE PREFERRED EMBODIMENTS

The thermocouple 10 shown in the drawing includes a tip 11 of tubular configuration and normally made of ferritic stainless steel, within which is a thermocouple wire 12. The top extremities of the tip 11 and the thermocouple wire 12 are joined by thermal fusion to form the thermocouple hot junction 13. The lower extremity of the thermocouple wire 12 is connected to the conductor wire 14 to form the cold junction 15. This cold junction joint is achieved by inserting an insulation stripped length of the conductor wire 14 into a cylindrical drilled cavity of the thermocouple wire 12 at the adjacent end, so that by stored energy resistance fusion a joint of virtually zero electrical resistance and high physical stregth is obtained. An insulation tube 16 extends around the conductor wire 14 from the vicinity of the cold junction 15 to the inner end of the tip 11. The conductor wire 14, which has an insulation covering, extends from the thermocouple wire 12 passing through the insulator tube 16 and thence through a metallic tube 17 to a male terminal contact, which adapts to a mating female contact in the control of appliance receiving the thermal energy.

The tip 11 is mechanically and electrically connected to the tubing 17 at a second cold junction within a base fitting 18. The latter member typically is made of a brass alloy and is circular in cross section. A portion 19 that extends to the outer end 20 of the fitting 18 is of larger exterior diameter than the portion 21 at the opposite end 22 of the fitting. An annular groove 23 is machined at the mid portion of the part 21 of the base fitting for use in securing the base fitting in its position adjacent the pilot burner in some thermocouple attaching applications.

The base fitting 18, as shown in FIG. 3, has a bore extending through it which has a relatively small diameter portion 24 extending inwardly from the outer end 20 and a longer part 25 of larger diameter extending inwardly from the opposite end 22. The bore portions 24 and 25 are interconnected by a frustoconical or beveled portion 26 which may be at a 45 degree angle to the longitudinal axis of the base fitting. The smaller bore part 24 and the frustoconical surface 26 are within the portion of the base fitting having the larger external diameter 19 so that the base fitting has a relatively thick wall in those areas.

The tube 17 is given an outward flare 27 at its end which complementarily engages the frustoconical surface 26 of the base fitting when the tube and base fitting are assembled. From the flared end 27, the tube then extends outwardly from the base fitting through the smaller bore portion 24.

The inner end 29 of the tip 11 is beveled to the same angle as that of the bore surface 26. Inwardly of the bevel 29 the tip 11 is provided with a straight knurl 30 extending longitudinally of the tip. The major diameter of the knurl 30 is larger than that of the tip inwardly of the knurl. This diameter also is greater than that of the bore 25 of the base fitting 18. The minor diameter of the knurl 30 is slightly less than the diameter of the bore 25. In a typical example where the bore 25 is around three-sixteenths inch diameter, the major diameter of the knurl is around 0.006 inch greater than that of the bore and the minor diameter is about 0.003 inch under the bore diameter. In length, the knurl 30 is just under the length of the bore 25.

The tip 11 is connected to the base fitting 18 by forcing it into the bore 25 after the end 27 of the tube 17 has been located within the base fitting. A minimum force of 500 pounds is exerted in pushing the end of the tip 11 into the base fitting. As this takes place, the teeth of the knurl 30 cut into the wall of the bore 25 and become embedded in the base fitting 18. The fitting tightly grips the periphery of the end portion of the tip and the flared end 27 of the tubing 17 is forced against the surface 26 of the bore.

Consequently, a strong mechanical connection is effected between the tip and the base fitting 18. There is a large area of contact between the knurl teeth and the fitting 18, as well as between the fitting surface 26 and the flared end 27 of the tube 17. By being pressed firmly into the base fitting, the beveled end 29 of the tip tightly clamps the flared end 27 of the tube 17 against the frustoconical bore surface 26. These features result in an electrical connection from the tip 11 to the tube 16 with virtually zero resistance, and important factor in view of the low current and potential generated by such thermocouples. The mechanical strength of the joint easily exceeds any working forces and torques that the thermocouple assembly will experience in field handling and service, and the unit is not subject to fatigue failure. Moreover, the strength of the joint does not diminish under high temperature service and the pressed knurled joint of the thermocouple will withstand temperatures up to 800°F. or higher depending upon the selected component materials. Also, the connection made at the base fitting 18 is essentially gas tight. With the joint formed as described above, it is no longer necessary to use copper for the conductor tubing 17. Aluminum alloys, bronze, steel and stainless steel, and other current conducting tubings, many of which are not suited to brazing processes, are adaptable to this knurled pressed joint.

The foregoing detailed description is to be clearly understood as given by way of illustration and example only; the spirit and scope of this invention being limited solely by the appended claims.

I claim:

1. The method of connecting a thermocouple tip to the conductor tubing of a thermocouple assembly comprising the steps of
    providing a member of electrically conductive material with a bore and a laterally directed surface within said bore,
    providing a laterally directed end on a length of tubing of electrically conductive material,
    providing a thermocouple tip with an end portion,
    positioning said tubing in said bore so that said laterally directed end is adjacent said laterally directed surface,
    then forcing said end portion of said tip against said laterally directed end so as to cause said laterally directed end to be held against said laterally directed surface, and simultaneously causing said member at said bore to tightly grip the periphery of said end portion,
    thereby to form an electrical and mechanical connection between said thermocouple tip and said tubing.

2. The method of connecting the thermocouple tip to the conductor tubing of a thermocouple assembly comprising the steps of
    providing a member of electrically conductive material with a bore and a laterally directed surface within said bore,
    providing an outwardly flared end on a length of tubing of electrically conductive material,
    providing a thermocouple tip with an end portion having at least a part thereof which is larger in external lateral dimension than the lateral dimension of said bore,
    positioning said tubing in said bore so that said outwardly flared end thereof is adjacent said laterally directed surface in said bore, and
    then forcing said end portion of said thermocouple tip into said bore so that said end portion of said tip presses said outwardly flared end of said tubing against said laterally directed surface in said bore, and said member at said bore grips said end portion of said tip,
    thereby to form an electrical and mechanical connection between said thermocouple tip and said tubing.

3. The method of connecting the thermocouple tip to the conductor tubing of a thermocouple assembly comprising the steps of
    providing a member of electrically conductive material with a bore and a laterally directed surface within said bore,
    providing an outwardly flared end on a length of tubing of electrically conductive material,
    providing a thermocouple tip with an end portion having external tooth means such that said end of said tip has a larger major lateral dimension than the lateral dimension of said bore,
    positioning said tubing in said bore so that said outwardly flared end thereof is adjacent said laterally directed surface in said bore, and
    then forcing said end portion of said thermocouple tip into said bore so that said tooth means cut the wall of said bore and become embedded therein and said end portion of said tip presses said outwardly flared end of said tubing against said laterally directed surface in said bore,
    thereby to form an electrical and mechanical connection between said thermocouple tip and said tubing.

4. The method as recited in claim 3 in which said laterally directed surface is made frustoconical, and said end portion of said tip is provided with a beveled end surface having the same angle as that of said laterally directed surface.

5. The method as recited in claim 4 in which for said tooth means a straight knurl is formed on said tip extending longitudinally thereof.

6. The method as recited in claim 5 in which said straight knurl is given a major diameter greater than the diameter of said bore, and a minor diameter less than said diameter of said bore.

7. The method as recited in claim 6 in which at least substantially 500 pounds is exerted in said forcing of said end of said tip into said bore.

8. A thermocouple device comprising
a member of electrically conductive material having a bore therethrough and a laterally directed surface in said bore,
a length of tubing of electrically conductive material, said tubing having a laterally directed end portion engaging said laterally directed surface of said member,
and a thermocouple tip of electrically conductive material,
said tip having an end portion received in said bore with said member at said bore gripping the periphery of said end portion,
said end portion of said tip having a surface engaging said laterally directed end portion of said tubing and holding the same against said laterally directed surface of said member, whereby an electrical and mechanical connection is provided between said thermocouple tip and said tubing.

9. A thermocouple device comprising
a member of electrically conductive material having a bore therethrough and a laterally directed surface in said bore,
a length of tubing of electrically conductive material, said tubing having a laterally directed end portion engaging said laterally directed surface of said member,
and a thermocouple tip of electrically conductive material,
said tip having an end portion having tooth means thereon,
said end portion being received in said bore with said tooth means embedded in the wall of said bore for forming a mechanical and electrical connection therewith,
said end portion of said tip having a surface engaging said laterally directed end portion of said tubing and clamping the same against said laterally directed surface of said member.

10. A device as recited in claim 9 in which said tooth means of said tip is a straight knurl.

11. A device as recited in claim 10 in which said laterally directed surface is frustoconical, said laterally directed end portion of said tubing is flared and at the same angle as that of said laterally directed surface, and said surface of said end portion of said tip is beveled and at said angle, whereby said end portion of said tubing is complementarily engaged by said surface of said end portion of said tip and said laterally directed surface of said bore.

12. A device as recited in claim 11 in which
said bore has a first portion of relatively large diameter extending from laterally directed surface to one end of said member, and a second portion of relatively small diameter extending from said laterally directed surface to the opposite end of said member,
said end portion of said tip being received in said first portion of said bore,
said tubing extending from said end portion thereof outwardly through said second portion of said bore.

* * * * *